United States Patent
Lee et al.

(10) Patent No.: US 7,210,012 B2
(45) Date of Patent: Apr. 24, 2007

(54) WRITE-PROTECTION BLOCKS FOR NON-VOLATILE SEMICONDUCTOR MEMORY DEVICE

(75) Inventors: Jin-Yub Lee, Seoul (KR); Seok-Heon Lee, Kyunggi-do (KR); Young-Joon Choi, Kyunggi-do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 368 days.

(21) Appl. No.: 10/417,770

(22) Filed: Apr. 17, 2003

(65) Prior Publication Data
US 2004/0049645 A1 Mar. 11, 2004

(30) Foreign Application Priority Data
Sep. 6, 2002 (KR) .................. 10-2002-0053754

(51) Int. Cl.
*G06F 12/14* (2006.01)
(52) U.S. Cl. ........................ 711/163; 711/152
(58) Field of Classification Search ............. 711/102, 711/103, 152, 163
See application file for complete search history.

(56) References Cited

U.S. PATENT DOCUMENTS

| | | | |
|---|---|---|---|
| 5,197,034 A | 3/1993 | Fandrich et al. ............ 365/227 |
| 5,345,413 A | 9/1994 | Fisher et al. ................ 365/218 |
| 5,363,334 A | 11/1994 | Alexander et al. .......... 365/218 |
| 5,513,136 A | 4/1996 | Fandrich et al. ........ 365/185.04 |
| 5,845,332 A * | 12/1998 | Inoue et al. ................. 711/163 |
| 5,848,435 A * | 12/1998 | Brant et al. .................. 711/152 |
| 6,009,495 A * | 12/1999 | DeRoo et al. ............... 711/103 |
| 6,031,757 A | 2/2000 | Chuang et al. ......... 365/185.04 |
| 6,032,237 A * | 2/2000 | Inoue et al. ................. 711/163 |
| 6,209,069 B1 | 3/2001 | Baltar ......................... 711/163 |
| 6,874,069 B2 * | 3/2005 | Lin et al. ..................... 711/156 |

FOREIGN PATENT DOCUMENTS

| | | |
|---|---|---|
| JP | 10-161934 | 6/1998 |
| JP | 11-120781 | 4/1999 |

OTHER PUBLICATIONS

Notice to File a Response/Amendment to the Examination Report for Korean patent application No. 10-2002-0053754 mailed on Apr. 28, 2005.

* cited by examiner

*Primary Examiner*—T Nguyen
(74) *Attorney, Agent, or Firm*—Myers Bigel Sibley & Sajovac, P.A.

(57) ABSTRACT

A non-volatile semiconductor memory device and/or a data processing system include a non-volatile memory array having a plurality of memory blocks and a write-protection control circuit that controls access to blocks of memory based on a start block address and an end block address. The write-protection control circuit may store start and end block addresses of an unlock region of the non-volatile memory array, and selectively activate a write enable signal according to the relationship between a write address and the start and end block addresses.

24 Claims, 11 Drawing Sheets

WRITE-PROTECTION BLOCKS FOR NON-VOLATILE SEMICONDUCTOR MEMORY DEVICE

RELATED APPLICATIONS

This application claims priority from Korean Patent Application No. 2002-53754, filed on Sep. 6, 2002, the disclosure of which is incorporated herein by reference in its entirety.

FIELD OF THE INVENTION

The present invention is related to semiconductor memory devices, and in particular, to non-volatile semiconductor memory devices.

BACKGROUND OF THE INVENTION

Integrated circuit memory devices are widely used in consumer and commercial applications. As is well known to those having skill in the art, integrated circuit memory devices include, but are not limited to, Dynamic Random Access Memory (DRAM) devices, Static Random Access Memory (SRAM) devices, Masked Read-Only Memory (MROM) devices, Programmable Read-Only Memory (PROM) devices, Erasable Programmable Read-Only Memory (EPROM) devices and Electrically Erasable Programmable Read-Only Memory (EEPROM) devices.

Memories, such as Flash EEPROM (erasable programmable read-only memory) devices, have been widely used in a wide range of digital applications as non-volatile, electrically erasable and programmable memory. Flash memory devices typically use one-transistor memory cells that allow for high memory densities, high reliabilities, and low power consumption. Thus, flash memory devices have been used in many low-power applications, such as battery-backed or embedded memory circuits. Common uses of non-volatile memory include portable computers, personal digital assistant devices, digital cameras, and cellular phones. In these devices, both program code and system data, such as configuration parameters and other firmware, are often stored in flash memory because of the compact storage and relative ease of software upgradeability. The use of flash memory to store upgradeable data has necessitated the development of mechanisms to protect the data from unintended erasure or reprogramming.

With conventional flash memory devices, erasing stored code or data required erasing the entire device. More recent devices, however, are based on a block-erasure architecture in which the flash memory is divided into blocks that are loosely analogous to the disk sectors recognized by disk operating systems. The block-based architecture allows file systems to erase blocks of flash memory instead of the whole device. The block architecture also allows users to flexibly erase different portions of code or data in a flash memory device. For example, critical system code, such as boot code, can be stored in a lockable or write-protection boot block of the device, while other blocks are allocated to other portions of code or data.

To ensure the integrity of a block-based flash memory device, block protection schemes are used to protect stored data when the memory is modified through program or erase operations. Memory blocks are protected against unintended writes when data is written in the device or when a new code segment is updated. Likewise, data blocks are protected when other data blocks are modified or when code updates occur. Code blocks may also be protected against program virus or software abnormalities.

An example of a system for protecting an unintended write operation is disclosed in U.S. Pat. No. 6,209,069 entitled "METHOD AND APPARATUS USING VOLATILE LOCK ARCHITECTURE FOR INDIVIDUAL BLOCK LOCKING ON FLASHMEMORY." A block control circuit described in the '069 patent is illustrated in FIG. 1. Referring to FIG. 1, a block control circuit 206 includes a plurality of digital registers 302–306 each corresponding to memory blocks. Each register or latch controls a lock or write-protection state of a corresponding lockable memory block.

The block control circuit 206 generates appropriate control signals to control a flash memory array.

The block control circuit 206 may, however, reduce the ability to provide a high-density flash memory device. Such may be the case because several thousand memory blocks may be used in forming a NAND-type flash memory device. For example, a 128M NAND-type flash memory device includes 1024 memory blocks. In order to store lock or write-protection information for 1024 memory blocks, the same number of registers as memory blocks are used in the system illustrated in FIG. 1. As memory capacity increases, the number of memory blocks also increases. Accordingly, it may be difficult to utilize the block control circuit using registers in a high-density flash memory device.

SUMMARY OF THE INVENTION

Embodiments of the present invention provide a memory device that includes a non-volatile memory array having a plurality of memory blocks and a write-protection control circuit. The write-protection control circuit is configured to store a start block address and an end block address associated with write protected regions of the non-volatile memory array and wherein the write-protection control circuit is further configured to control a write operation of the non-volatile memory array based on a relationship of a write block address of the write operation to the start block address and the end block address.

In particular embodiments of the present invention, the write-protection control circuit is configured to allow the write operation if the write block address is between the start block address and the end block address. The write-protection control circuit could also be configured to prevent the write operation if the write block address is not between the start block address and the end block address.

In further embodiments of the present invention, the write-protection control circuit is configured to allow the write operation if the write block address is not between the start block address and the end block address. The write-protection control circuit could also be configured to prevent the write operation if the write block address is between the start block address and the end block address.

In additional embodiments of the present invention, the write-protection control circuit is further configured to allow the start and end block addresses stored in the write-protection control circuit to be updated so as to change that the write protected regions of the non-volatile memory. The write-protection control circuit may also be configured to prevent the start and end block addresses from being updated after the start and end block addresses are initially stored in the write-protection control circuit. The write-protection control circuit may be further configured to remove an update-protection state of the start and end block addresses responsive to a reset signal.

In yet other embodiments of the present invention, the write-protection control circuit is configured to latch the start block address in response to a first command indicating an input of the start block address and latch the end block address in response to a second command indicating an input of the end block address.

In additional embodiments of the present invention, the write-protection control circuit is configured to prevent write operations to any of the memory blocks of the non-volatile memory array at power-up.

In further embodiments of the present invention, the write-protection control circuit is configured to store a plurality of start and stop block addresses that define a plurality of unlocked regions and to control a write operation of the non-volatile memory array based on a relationship of a write block address of the write operation to the plurality of unlocked regions.

In still other embodiments of the present invention, a non-volatile semiconductor memory device includes a non-volatile memory array having a plurality of memory blocks and a write control circuit configured to control a write operation of the non-volatile memory array in response to a write enable signal. A write-protection control circuit is configured to store start and end block addresses of an unlock region of the non-volatile memory array and selectively activate the write enable signal according to whether a write address of the write operation deviates from an address region between the start and end block addresses.

In such embodiments, the write-protection control circuit may include an address register configured to latch the start block address in response to a first address latch signal and latch the end block address in response to a second address latch signal, a detector circuit configured to generate a lock flag signal indicating whether the write address deviates from the address region between the start block address and the end block address and a command decoder circuit configured to generate the first address latch signal in response to a first command indicating an input of the start block address, to generate the second address latch signal in response to a second command indicating an input of the end block address and to activate the write enable signal in response to the lock flag signal.

In certain embodiments of the present invention, the detector circuit is activated after either one of the first and second commands is applied. The detector circuit may be further configured to set the lock signal to prevent the write operation after power-up and until the detector circuit is activated.

In still other embodiments of the present invention, the address register is further configured to update the start and end block addresses responsive to receipt of subsequent first and second commands. The address register may be further configured to prevent updating of the start and end block addresses subsequent to receipt of a third command for protecting a change of the start and end block addresses. The address register may also be further configured to allow updating of the start and end block addresses subsequent to receipt of a reset signal.

In additional embodiments of the present invention, when the external address deviates from the address region between the start and end block addresses, the command decoder circuit inactivates the write enable signal so that the write operation of the non-volatile memory array is locked. Furthermore, when the external address belongs to the address region between the start and end block addresses, the command decoder circuit activates the write enable signal so that the write operation of the non-volatile memory array is carried out.

In still further embodiments of the present invention, a non-volatile semiconductor memory device includes a non-volatile memory array having a plurality of memory blocks, a write control circuit configured to control a write operation of the non-volatile memory array in response to a write enable signal, an address register configured to store start and end block addresses for defining an unlock region of the non-volatile memory array in response to first and second address latch signals, an address comparator circuit configured to generate a lock flag signal indicating whether an external address deviates from an address region between the start block address and the end block address, a command decoder circuit configured to generate the first and second address latch signals in response to first and second commands indicating input of the start and end block addresses respectively, and to decode a write command in response to the lock flag signal so as to generate the write enable signals and a power-on reset circuit configured to generate a reset signal, the address register, the address comparator circuit, and the command decoder circuit being initialized by the reset signal. The non-volatile semiconductor memory device may also include an interface circuit configured to interface with an external device, wherein the interface circuit inactivates an unlock flag signal in response to activation of the reset signal so that the write operation of the non-volatile memory array is locked, and the address comparator circuit operates responsive to the unlock flag signal.

In additional embodiments of the present invention, the start and end block addresses are updated by subsequent first and second commands. The interface circuit may also be configured to generate a lock-tight flag signal in response to a third command for protecting a change of the start and end block addresses. The address register may be configured to update-protect the stored start and end block addresses responsive to the lock-tight flag signal. The interface circuit may be configured to inactivate the lock-tight flag signal responsive to a reset signal. The interface circuit may also include a state register configured to store a state code indicating lock, unlock, and lock-tight states, the state register being externally accessible.

In other embodiments of the present invention, a data processing system is provided including a host processor, a non-volatile memory and a memory controller operably associated with the host processor and the non-volatile memory so as to control access to the non-volatile memory. The memory controller includes a non-volatile memory array having a plurality of memory blocks, a write control circuit configured to control a write operation of the non-volatile memory array in response to a write enable signal and a write-protection control circuit configured to store start and end block addresses of an unlock region of the non-volatile memory array and selectively activate the write enable signal according to whether a write address of the write operation deviates from an address region between the start and end block addresses.

In additional embodiments of the present invention, a data processing system including a host processor, a non-volatile memory and a memory controller operably associated with the host processor and the non-volatile memory so as to control access to the non-volatile memory. The memory controller includes a write control circuit configured to control a write operation of the non-volatile memory array in response to a write enable signal, an address register configured to store start and end block addresses for defining an unlock region of the non-volatile memory array in response to first and second address latch signals, an address comparator circuit configured to generate a lock flag signal indicating whether an external address deviates from an address region between the start block address and the end block address, a command decoder circuit configured to generate the first and second address latch signals in response to first and second commands indicating input of the start and end block addresses respectively, and to decode a write command in response to the lock flag signal so as to generate the write enable signals and a power-on reset circuit configured to generate a reset signal, the address register, the address comparator circuit, and the command decoder circuit being initialized by the reset signal.

In yet additional embodiments of the present invention, a memory device is provided that includes a non-volatile memory array having a plurality of memory blocks and write-protection control means for storing a start block address and an end block address associated with write protected regions of the non-volatile memory array and controlling a write operation of the non-volatile memory array based on a relationship of a write block address of the write operation to the start block address and the end block address.

DESCRIPTION OF THE PREFERRED EMBODIMENTS

Figure 1:
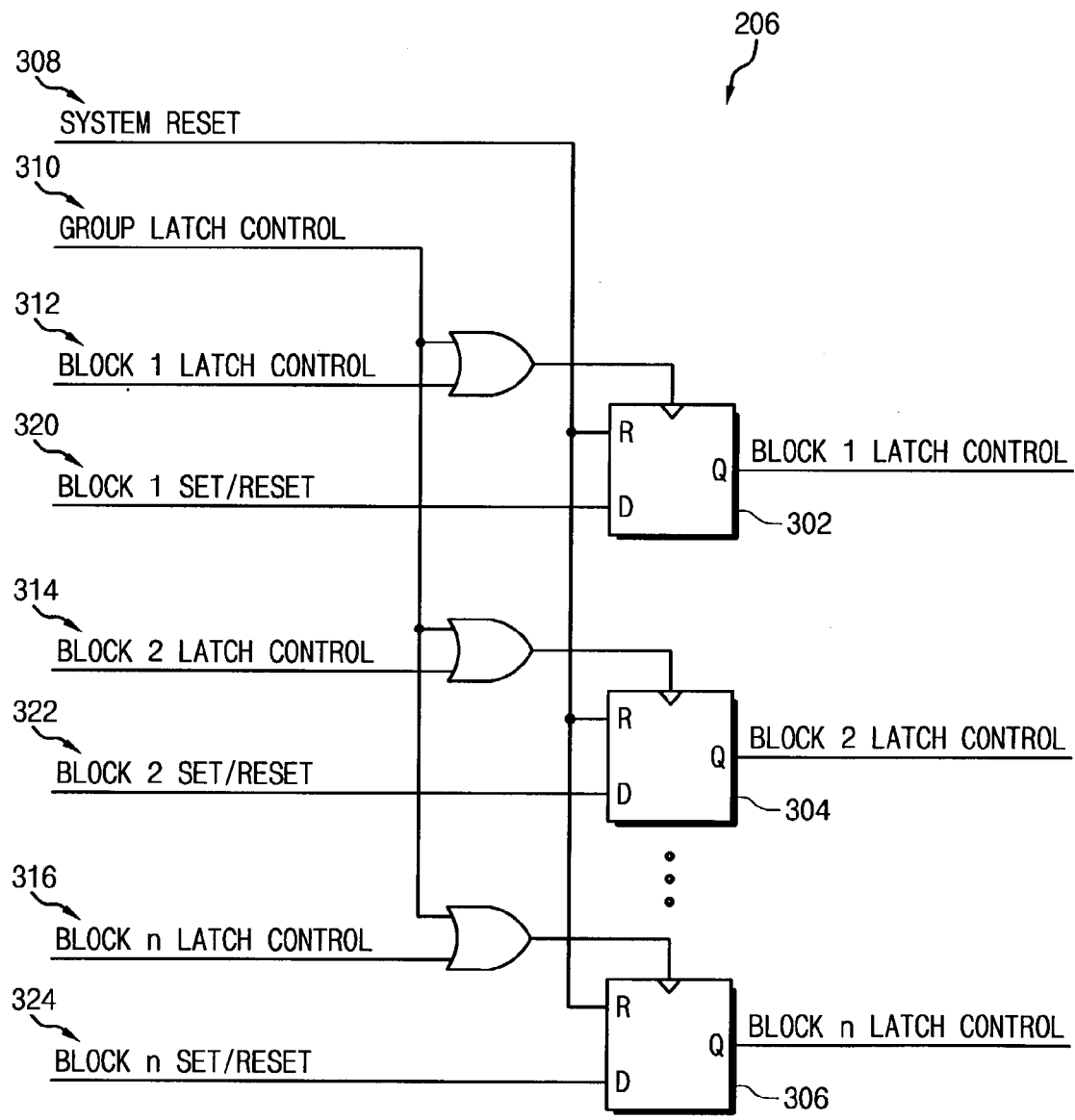
FIG. 1 is a circuit diagram of a conventional flash memory device.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. It also will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or flowchart illustrations of write-protection systems and/or operations according to embodiments of the invention. It is understood that each block of the block diagrams and/or flowchart illustrations, and combinations of blocks in the block diagrams and/or flowchart illustrations, can be implemented by in hardware, computer program instructions and/or combinations of hardware and computer instructions. These computer program instructions may be provided to a processor of a general purpose computer, special purpose computer, digital signal processor, and/or other programmable data processing apparatus, for example such that the instructions, which execute via the processor of the computer and/or other programmable data processing apparatus, create a circuit and/or means for implementing the functions/acts specified in the block diagrams and/or flowchart block or blocks.

These computer program instructions may also be stored in a computer-readable memory such that the instructions stored in the computer-readable memory produce an article of manufacture including instructions which implement the functions/acts specified in the block diagrams and/or flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 2:
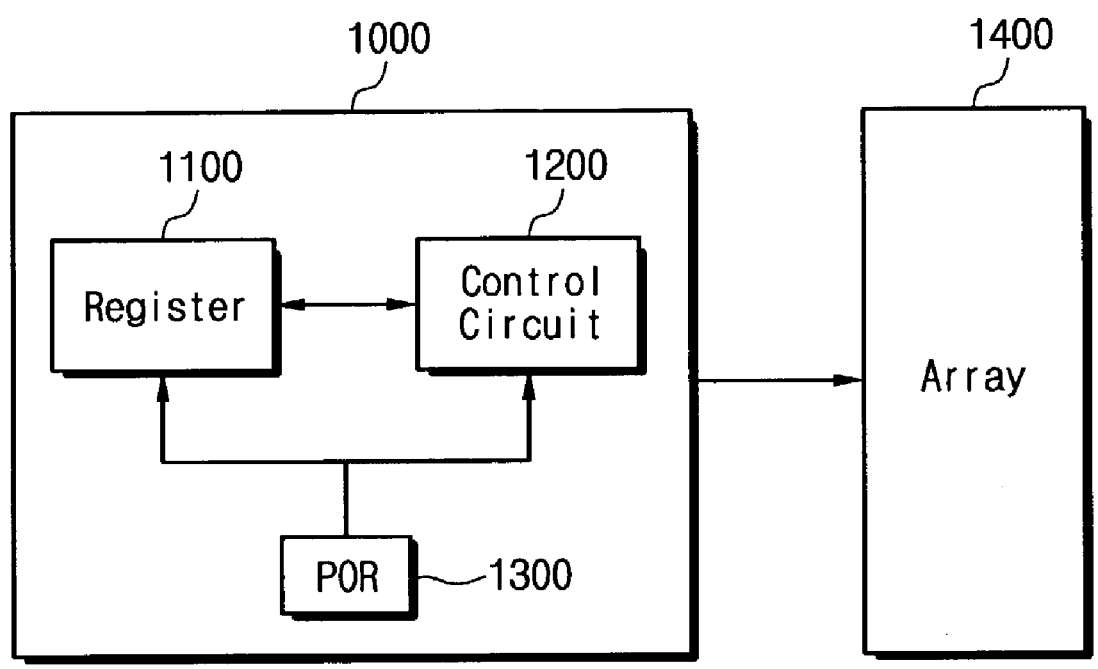
FIG. 2 is a block diagram of a write-protection control circuit according to embodiments of the present invention.
Figure 3:
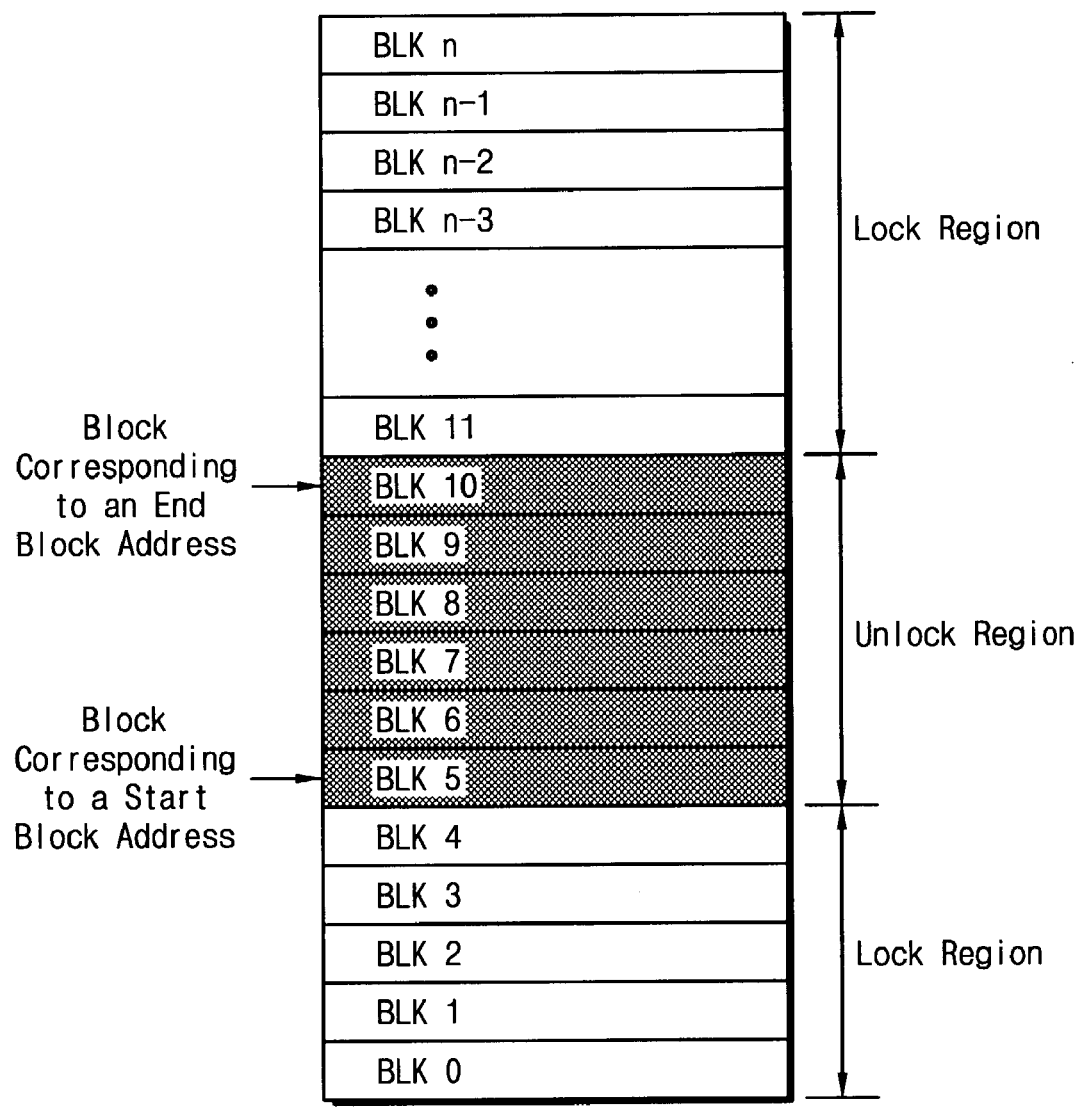
FIG. 3 is a memory map diagram of unlock and lock regions of a non-volatile memory array illustrated in FIG. 2.

FIG. 2 is a block diagram of a write-protection control circuit according to embodiments of the present invention. Referring to FIG. 2, a write-protection control circuit 1000 according to embodiments of the present invention protects a write operation related to a predetermined lock (or write-protection) region of a non-volatile memory array 1400, and includes a register 1100, a control circuit 1200, and a power-on reset circuit 1300. The non-volatile memory array (e.g., a NAND-type flash memory array) 1400, as illustrated in FIG. 3, includes a plurality of memory blocks BLK0–BLKn.

The register 1100 stores a start block address and an end block address that define a lock region of the non-volatile memory array 1400. That is, in an unlocked region, an address for selecting the first memory block of the unlock region is the start block address and an address for selecting the last memory block thereof is the end block address.

Except for memory blocks belonging to the unlock region, remaining memory blocks may be allocated to a lock region. Namely, in embodiments of the present invention, lock and unlock regions of the non-volatile memory array 1400 can be defined by loading of start and end block addresses. While embodiments of the present invention are described herein with regard to allocating memory blocks as locked that are not within a start block address and an end block address, in other embodiments of the present invention, memory blocks are allocated as unlocked unless the memory blocks are within the start block address and the end block address.

In particular embodiments of the present invention, the control circuit 1200 determines whether an address received for a write operation is outside an address region between a start block address and an end block address that are stored in the register 1100. If the received address is outside the defined address region, the control circuit 1200 prevents a write operation of the non-volatile memory array 1400.

The power-on reset circuit 1300 initializes the register 1100 and the control circuit 1200 in response to an input of a power supply voltage. After initializing and before loading of start and end block addresses, all memory blocks of the non-volatile memory array 1400 are initialized as included in a lock region, which will be described more fully hereinafter.

In the embodiments of the present invention illustrated in FIG. 2, start and end block addresses stored in the register 1100 can be updated under the control of the control circuit 1200. However, if a command for protecting a change of the start and end block addresses (hereinafter, referred to as a lock-tight command) is applied, the update of the start and end block addresses stored in the register 1100 is prevented. In certain embodiments of the present invention, an update-protection (or lock-tight) state of the register 1100 may be removed only by a system reset operation. The above functions will be more fully described hereinafter.

In contrast to the conventional memory locking system where a lock state of the memory blocks BLK0–BLKn of the non-volatile memory array 1400 is established by corresponding registers or latches, respectively, embodiments of the present invention use start and end block addresses of memory blocks appointed to define locked and unlocked states for the memory blocks. For example, referring to FIG. 3, an unlock region is defined from a memory block BLK5 corresponding to a start block address to a memory block BLK10 corresponding to an end block address. Remaining memory blocks BLK0–BLK4 and BLK11–BLKn are automatically allocated to a lock region. In contrast, the prior art utilized registers or latches for each corresponding memory block in order to establish locked states of memory blocks. However, in embodiments of the present invention, locked or write-protection states of memory blocks can be established only using registers for storing start and end block addresses.

Figure 4:
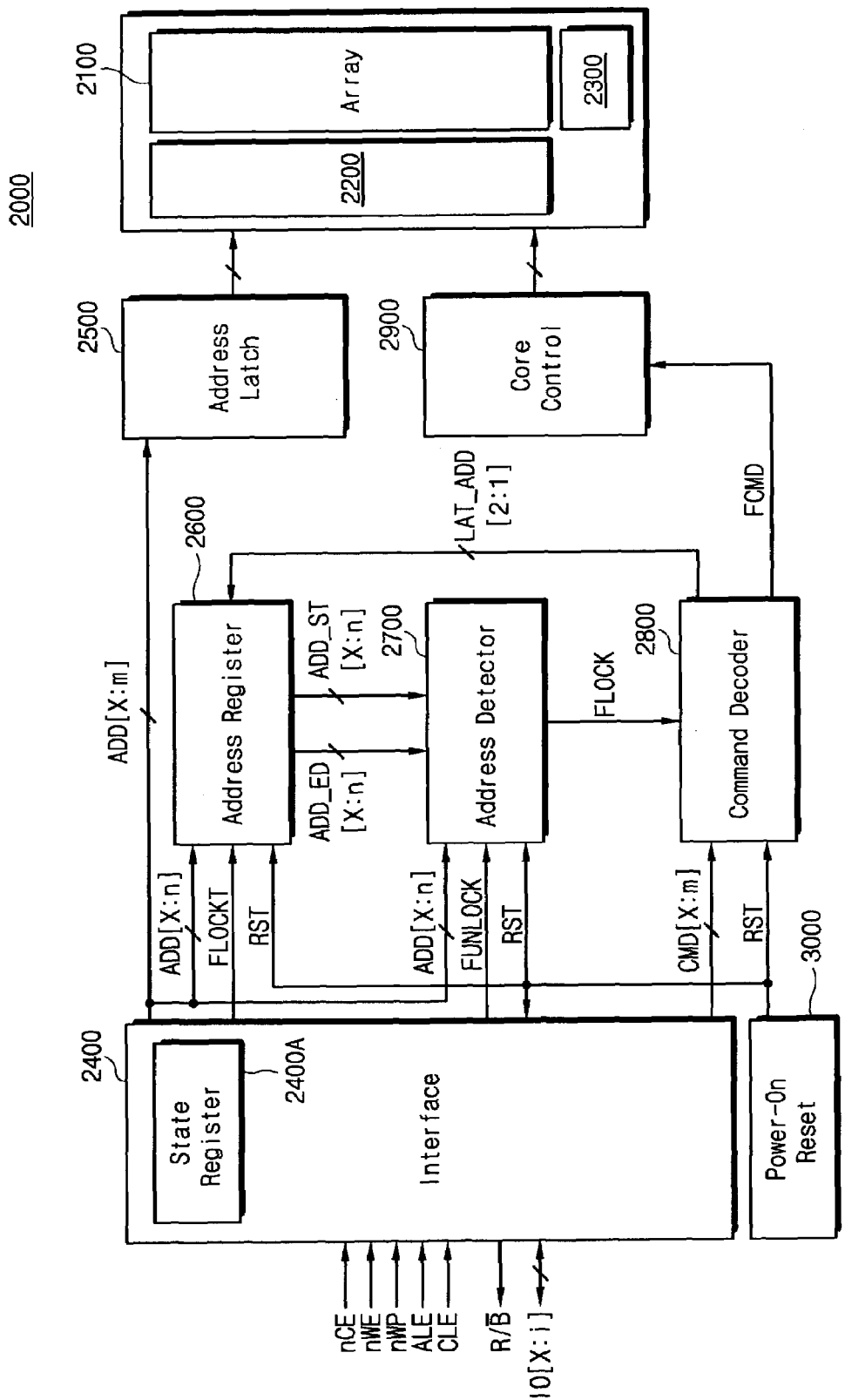
FIG. 4 is a block diagram of a non-volatile semiconductor memory device according to further embodiments of the present invention.

FIG. 4 shows a non-volatile semiconductor memory device according to embodiments of the present invention. A non-volatile semiconductor memory device 2000 according to particular embodiments of the present invention provides a NAND-type flash memory device and includes a non-volatile memory array 2100 that is divided into a plurality of memory blocks. Read and write operations of the non-volatile memory array 2100 are performed by a row selector block 2200 and a page buffer & column selector block 2300, as is well known to those skilled in the art and need not be described further herein.

As is further illustrated in FIG. 4, an interface circuit 2400 interfaces with an external device (e.g., a host processor and/or a memory controller), and is connected with control signal pins nCE, nWE, nWP, ALE, CLE, and R/$\overline{B}$ and data input/output pins IO[X:i]. Embodiments of the present invention may include a NAND-type flash memory device that has a command/address/data multiplexed input/output structure as is provided in conventional NAND-type flash memory devices. However, as described herein, the command/address/data multiplexed input/output structure may be modified to support the block address based memory lock according to embodiments of the present invention. In such embodiments of the present invention as illustrated in FIG. 4, commands and addresses are input via data input/output pins IO[X:i], and data is input and output via the data input/output pins IO[x:i]. A chip enable signal is applied to the nCE pin, a write enable signal to the nWE pin, and a write protection signal to the nWP pin. The ALE pin is provided with an address latch enable signal, and the CLE pin is provided with a command latch enable signal. The pin R/$\overline{B}$ is used to indicate an operating state of the memory device.

The interface circuit 2400 includes a state register 2400A, in which lock (or write-protection) state information is stored. Data stored in the state register 2400A is accessed by an external device, and states of the non-volatile memory array 2100 according to data values of the state register 2400A are as identified in Table 1 below.

TABLE 1

| Bits 0 through 2 of the State Register 2400A | | | |
|---|---|---|---|
| | B2 | B1 | B0 |
| Unlock state | 1 | 0 | 0 |
| Lock state | 0 | 1 | 0 |
| Lock-tight state | 0 | 0 | 1 |

The unlock state indicates that an unlock region of the non-volatile memory array 2100 is defined by a start block address and an end block address. That is, when a value of the state register 2400A indicates the unlock state, memory blocks of the unlock region may be programmed/erased. The lock state indicates that all memory blocks of the array 2100 are set to a lock (or write-protection) state. That is, when a value of the state register 2400A indicates the lock state, all memory blocks thereof are write-protected. The lock-tight (or update-protection) state indicates that presently set unlock and lock regions of the non-volatile memory array 2100 cannot be changed.

The interface circuit 2400 outputs an address ADD[X:m], which is latched by an address latch circuit 2500. Along with the address ADD[X:m], the interface circuit 2400 also provides a block address ADD[X:n] for identifying a memory block that is transferred to an address register 2600 and an address detector circuit 2700. The address register 2600 latches the block address ADD[X:n] from the interface circuit 2400 in response to address latch signals LAT_ADD [2:1]. For example, the address register 2600 latches a start block address that identifies the first memory block of an unlock region in response to a toggle of the address latch signal LAT_ADD1. The address register 2600 latches an end block address that identifies the last memory block of the unlock region in response to a toggle of the address latch signal LAT_ADD2.

The address detector circuit 2700 operates responsive to an unlock flag signal FUNLOCK from the interface circuit

2400, and detects whether an input address ADD[X:n] is outside an address region between start and end block addresses ADD_ST[X:n] and ADD_ED[X:n] from the address register 2600. As a result of the detection of the relationship of the input address ADD[X:n] to the start and stop addresses ADD_ST[X:n] and ADD_ED[X:n], the address detector circuit 2700 outputs a lock flag signal FLOCK indicating whether the input address ADD[X:n] is outside an address region between the start and end block addresses ADD_ST[X:n] and ADD_ED[X:n] from the address register 2600.

A command decoder circuit 2800 decodes command data CMD[X:m] from the interface circuit 2400, and generates the address latch signals and/or a command flag signal FCMD based on the decoding result and the lock flag signal FLOCK. A core control circuit 2900 controls a memory core in response to the command flag signal FCMD. A power-on reset circuit 3000 generates a reset signal RST in response to input of a power supply voltage and/or a reset signal. The interface circuit 2400, the address register 2600, the address detector circuit 2700, and the command decoder circuit 2800 are initialized by the reset signal RST output by the power-on reset circuit 3000.

Figure 5:
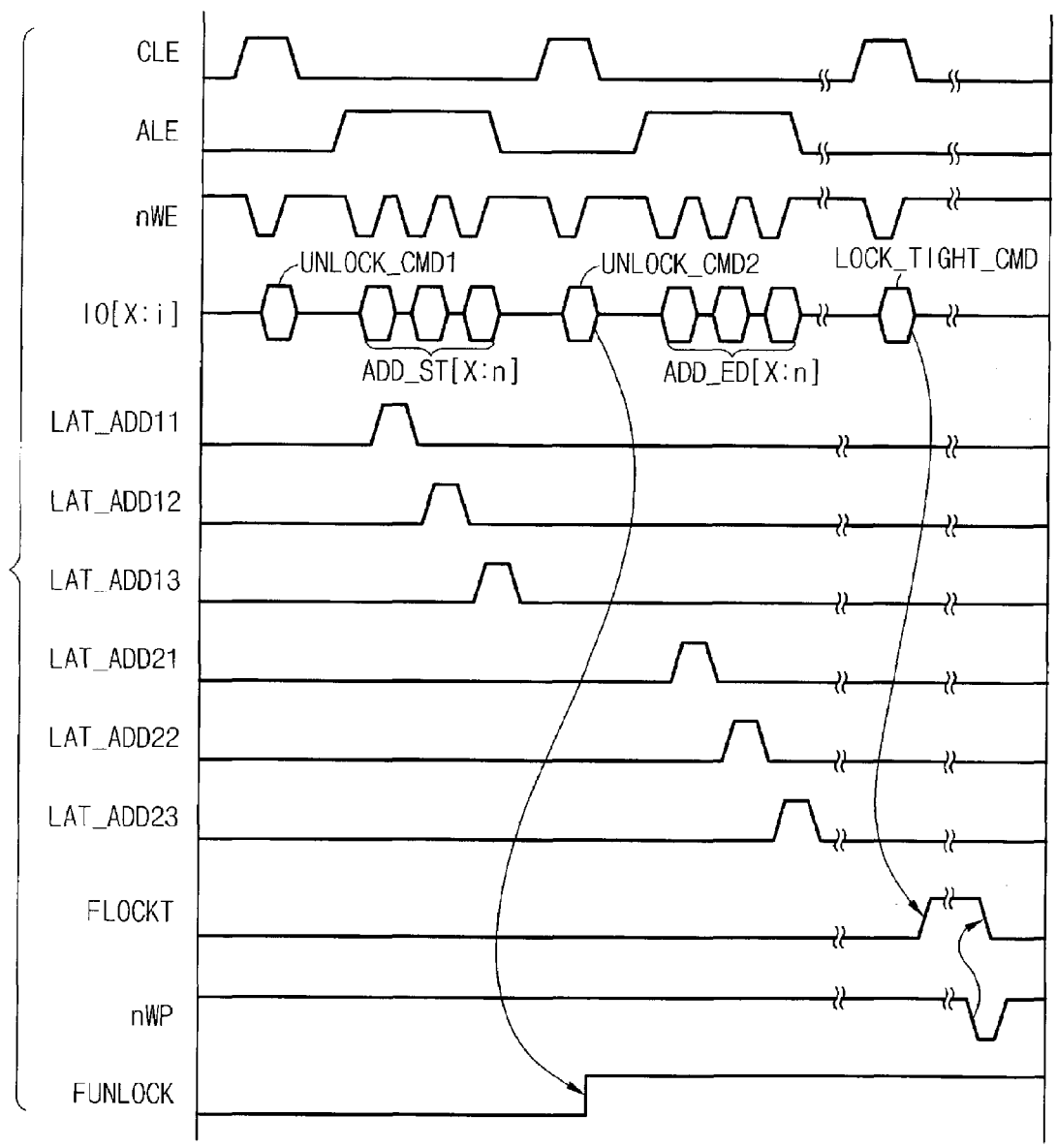
FIG. 5 is a timing diagram of a write-protection operation of a non-volatile semiconductor memory device according to embodiments of the present invention.

FIG. 5 is a timing diagram of particular write-protection operations of a non-volatile semiconductor memory device according to particular embodiments of the present invention and is described below with reference to FIGS. 4 and 5. The interface circuit 2400 is initialized at power-up such that control signals FLOCKT and FUNLOCK are inactive. Because the control signal FUNLOCK is inactivated, the address detector circuit 2700 is inactive, that is, does not perform a detection operation. In this case, a command flag signal FCMD from the command decoder circuit 2800 is inactive, so that a write operation of the non-volatile memory array 2100 is locked or protected. That is, at initialization, all memory blocks of the non-volatile memory array 2100 are initialized to within a lock region. A write-protection operation is described below based on these initial conditions.

When control signals CLE, ALE, and nWE have a high level, a low level, and a low level, respectively, the first unlock command data UNLOCK_CMD1 received through data input/output pins IO[X:i] is transferred to the command decoder circuit 2800 through the interface circuit 2400. The command decoder circuit 2800 decodes the unlock command data UNLOCK_CMD1 to generate an address latch signal LAT_ADD1. After input of the first unlock command data UNLOCK_CMD1, the ALE signal is set to a high level and a start block address ADD_ST[X:n] is applied to the interface circuit 2400 through the data input/output pins IO[X:i] in synchronization with toggling the control signal nWE. The start block address ADD_ST[X:n] from the interface block 2400 is latched by the address register 2600 during activation of the address latch signal LAT_ADD1.

When the control signals CLE, ALE, and nWE again have a high level, a low level, and a low level, respectively, the second unlock command data UNLOCK_CMD2 received through the data input/output pins IO[X:i] is transferred to the command decoder circuit 2800 through the interface circuit 2400. The command decoder circuit 2800 decodes the unlock command data UNLOCK_CMD2 to generate an address latch signal LAT_ADD2. After an input of the second unlock command data UNLOCK_CMD2, the ALE signal is again set to a high level and an end block address ADD_ED[X:n] is applied to the interface circuit 2400 through the data input/output pins IO[X:i] in synchronization with toggling of the control signal nWE. The end block address ADD_ED[X:n] from the interface circuit 2400 is latched by the address register 2600 during activation of the address latch signal LAT_ADD2.

The above operations are to store the start and end block addresses ADD_ST[X:n] and ADD_ED[X:n] in the address register 2600. That is, unlock and lock regions of the non-volatile memory array 2100 are established. Thus, as seen in FIG. 5, when the second unlock command UNLOCK_CMD2 is received by the interface circuit 2400, the state register 2400A is updated to enter the unlock state and the unlock flag FUNLOCK is activated by setting the signal FUNLOCK to a high state. After the above operations are completed, if a block address that is outside the unlock region is received, the write operation of the non-volatile memory array 2100 is protected (or locked). If a block address within the unlock region is received after the loading of the start and stop addresses are carried out, the write operation will be carried out normally.

As discussed above, while the address register 2600 is set, as illustrated in FIG. 5, the unlock flag signal FUNLOCK is activated after an input of the second unlock command data UNLOCK_CMD2. The address detector circuit 2700 does not perform a detection operation when the unlock flag signal FUNLOCK is inactive. As the unlock flag signal FUNLOCK is activated, the address detector can 2700 starts to perform the detection operation. Alternatively, the unlock flag signal FUNLOCK may be activated with receipt of the first unlock command data UNLOCK_CMD1 instead of the second unlock command data UNLOCK_CMD2.

As well known, a write operation of a memory device is generally divided into a program operation and an erase operation. To program data at any memory block, a serial data input command, an address, serial data, and a program command may be sequentially received according to conventional timing. To erase data stored in a memory block, a block erase setup command, an address, and an erase command may be sequentially received according to conventional timing.

Before the program/erase command is performed, the address detector block 2700 detects whether a presently received block address ADD[X:m] is outside the unlock address region between the start and end block addresses ADD_ST[X:n] and ADD_ED[X:n] that are stored in the address register 2600. If the presently received block address ADD[X:m] is outside the unlock address region, the address detector circuit 2700 activates the lock flag signal FLOCK. Although the program/erase command CMD[X:m] is received, the command decoder circuit 2800 inactivates a command flag signal FCMD in response to the lock flag signal FLOCK being inactive. A core control circuit 2900 prevents the program/erase operation from being performed in response to inactivation of the command flag signal FCMD.

If the presently received block address ADD[X:m] is within the unlock address region, the address detector circuit 2700 activates the lock flag signal FLOCK. The command decoder circuit 2800 decodes program/erase command CMD[X:m] in response to activation of the lock flag signal FLOCK, and activates the command flag signal FCMD. The core control circuit 2900 enables the program/erase operation to be performed, in response to activation of the command flag signal FCMD.

The start and end block addresses ADD_ST[X:n] and ADD_ED[X:n] stored in the address register 2600 can be updated to establish a new unlock region through the above-described procedure.

As is further illustrated in FIG. 5, a lock-tight command LOCK_TIGHT_CMD may be applied to protect the update of the start and end block addresses ADD_ST[X:n] and ADD_ED[X:n]. As shown in FIG. 5, when the lock-tight command LOCK_TIGHT_CMD is received by the interface circuit 2400, the lock-tight flag signal FLOCKT is activated. When the lock-tight flag signal FLOCKT is activated, new start and end block addresses are not latched in the address register 2600 even though the address latch signals LAT_ADD[2:1] are activated. Therefore, if the lock-tight flag signal FLOCKT is active, the address register 2600 goes to a lock-tight or update-protection state. The lock-tight state of the address register 2600 may be removed by activation (or a high-to-low transition) of the write-protection signal nWP.

Figure 6:
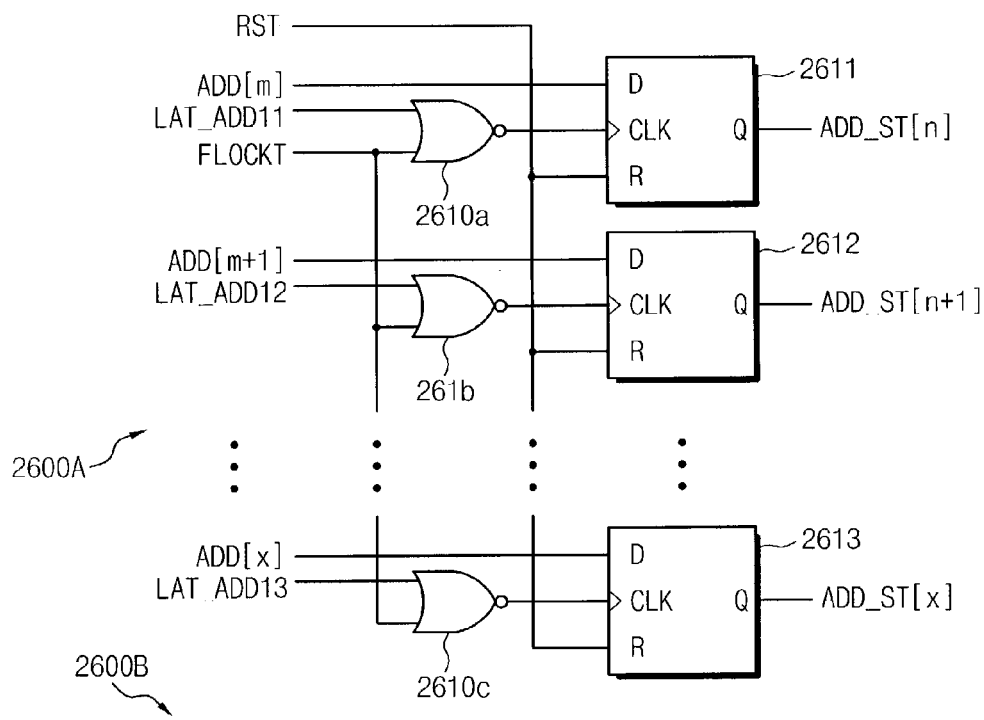
FIG. 6 is an embodiment of an address register illustrated in FIG. 4.
Figure 6:
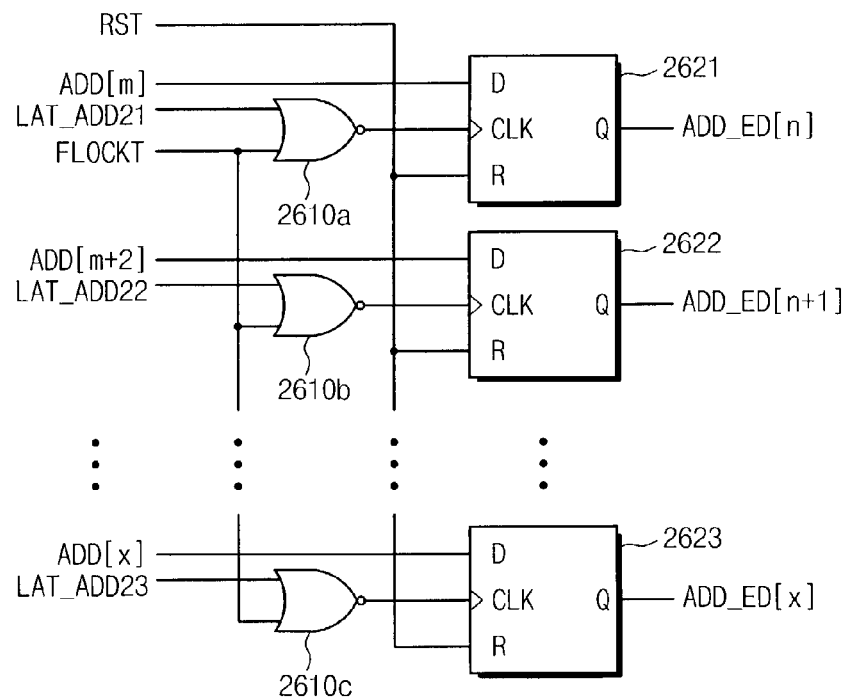

FIG. 6 shows an address register according to particular embodiments of the present invention. Referring to FIG. 6, an address register 2600 includes a start block address storing circuit 2600A and an end block address storing circuit 2600B. The start block address storing circuit 2600A latches a start block address ADD_ST[X:n] in response to an address latch signal LAT_ADD1, and the end block address storing circuit 2600B latches an end block address ADD_ED[X:n] in response to an address latch signal LAT_ADD2.

The start block address storing circuit 2600A includes a NOR gate 2610, a plurality of D flip-flops 2611–2613, and an inverter 2614. Each of the D flip-flops has a data input terminal D, a reset terminal R, a clock terminal CLK, and an output terminal Q. The reset terminal R of each D flip-flop is provided with a reset signal RST from the power-on reset circuit 3000 in FIG. 4, and an output signal of the NOR gate 2610 is applied to the clock terminal CLK of each D flip-flop. The NOR gate 2610 has the first input terminal supplied with the address latch signal LAT_ADD1 via the inverter 2614 and the second input terminal supplied with a lock-tight flag signal FLOCKT. Start block address bits ADD[n]–ADD[x] are applied to the data input terminals of corresponding D flip-flops 2611–2613 in the start block address storing circuit 2600A, respectively. The D flip-flops 2611–2613 of the start block address storing circuit 2600A output latch the start block address bits ADD_ST[n]–ADD_ST[x].

Still referring to FIG. 6, the end block address storing circuit 2600B includes a NOR gate 2620, a plurality of D flip-flops 2621–2623, and an inverter 2624. Each of the D flip-flops has a data input terminal D, a reset terminal R, a clock terminal CLK, and an output terminal Q. The reset terminal R of each D flip-flop is provided with the reset signal RST from the power-on reset circuit 3000 in FIG. 4, and an output signal of the NOR gate 2620 is applied to the clock terminal CLK of each D flip-flop. The NOR gate 2620 has the first input terminal supplied with the address latch signal LAT_ADD2 via the inverter 2624 and the second input terminal supplied with the lock-tight flag signal FLOCKT. End block address bits ADD[n]–ADD[x] are applied to the data input terminals of corresponding D flip-flops 2621–2623 in the end block address storing circuit 2600B, respectively. The D flip-flops 2621–2623 of the end block address storing circuit 2600B output latched end block address bits ADD_ED[n]–ADD_ED[x].

In operation, when the reset signal RST is activated, the D flip-flops 2611–2613 and 2621–2623 of the circuits 2600A and 2600B are reset. It is assumed that the lock-tight flag signal FLOCKT is inactivated low. Under this assumption, when the address latch signal LAT_ADD1 is activated high, the D flip-flops 2611–2613 of the start block address storing circuit 2600A latch corresponding start block address bits ADD[n]–ADD[x], respectively Likewise, when the address latch signal LAT_ADD2 is activated high, the D flip-flops 2621–2623 of the end block address storing circuit 2600B latch corresponding end block address bits ADD[n]–ADD[x], respectively. If the lock-tight flag signal FLOCKT is activated high, the start and end block address storing circuits 2600A and 2600B do not latch an input address irrespective of activation of the address latch signals LAT_ADD1 and LAT_ADD2.

Figure 7:
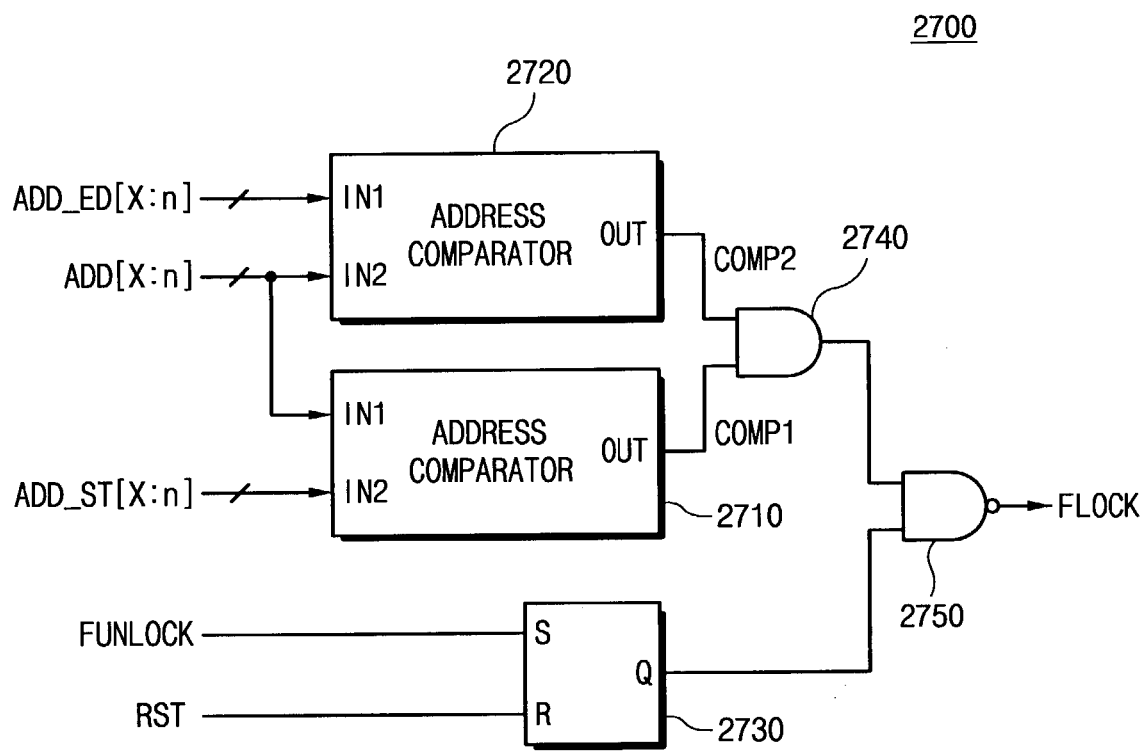
FIG. 7 is an embodiment of an address detector block illustrated in FIG. 4.

FIG. 7 shows an address detector circuit according to particular embodiments of the present invention. Referring to FIG. 7, an address detector circuit 2700 includes the first and second address comparators 2710 and 2720, an S-R flip-flop 2730, an AND gate 2740, and a NAND gate 2750. The first address comparator 2710 has the first input terminal IN1 connected to receive a start block address ADD_ST[X:n] from an address register 2600 in FIG. 4, the second input terminal IN2 is connected to receive an input block address ADD[X:n], and an output terminal OUT outputting a comparison signal COMP1. The first address comparator 2710 compares the input block address ADD[X:n] and the start block address ADD_ST[X:n] to output the comparison signal COMP1. The second address comparator 2720 has the first input terminal IN1 connected to receive an end block address ADD_ED[X:n] from the address register 2600 in FIG. 4, the second input terminal IN2 connected to receive the input block address ADD[X:n], and an output terminal OUT outputting a comparison signal COMP2. The second address comparator 2720 compares the input block address ADD[X:n] and the end block address ADD_ED[X:n] to output the comparison signal COMP2. The S-R flip-flop 2730 has a set terminal S connected to receive an unlock flag signal FUNLOCK, a reset terminal R connected to receive a reset signal RST, and an output terminal Q. The AND gate 2740 receives the comparison signals COMP1 and COMP2 from the first and second address comparators 2710 and 2720. The NAND gate 2750 outputs a lock flag signal FLOCK in response to an output signal of the AND gate 2740 and an output signal of the S-R flip-flop 2730.

In the first and second address comparators 2710 and 2720, when an input value of the first input terminal IN1 is more than that of the second input terminal IN2, its output terminal has a high level. On the other hand, when an input value of the first input terminal IN1 is less than that of the second input terminal IN2, its output terminal has a low level.

In operation, when the unlock flag signal FUNLOCK is activated, the output of the S-R flip-flop 2730 goes to a high level, thus allowing the FLOCK signal output of the NAND gate 2750 to be controlled by the comparator results. If the input block address ADD[X:n] belongs to the unlock address region between start and end block addresses ADD_ST[X:n] and ADD_ED[X:n], the comparison signals COMP1 and COMP2 both are set to a high level according to the above conditions, so that the output signal of the AND gate 2740 is also set to a high level. Because the input signals of the NAND gate 2750 are both set to a high level, the lock flag signal FLOCK goes to a low level. This means that a write operation may be carried out with respect to a memory block corresponding to the input block address.

If the input block address ADD[X:n] is less than the start block address ADD_ST[X:n], the comparison signal COMP1 goes low and the comparison signal COMP2 goes high, thus, causing the output of the AND gate 2740 to go low. Because the output signal of the AND gate 2740 becomes low, the lock flag signal FLOCK goes to a high level. If the input block address ADD[X:n] is more than the end block address ADD_ED[X:n], the comparison signal COMP2 goes to a low level, causing the output of the AND gate 2740 to go low. Because the output signal of the AND gate 2740 is at a low level, the lock flag signal FLOCK becomes high. The high level of the lock flag signal FLOCK indicates that a write operation is locked or write-protected with respect to a memory block corresponding to the input block address.

Accordingly, if an input block address belongs to an unlock address region between start and end block addresses stored in an address register 2600, a lock flag signal FLOCK is inactivated low and a write operation may be carried out. On the other hand, if an input block address deviates from the unlock address region, the lock flag signal FLOCK is activated high and no write operations may be carried out. That is, in a case where unwanted or unintended block address is received, a write operation of a non-volatile memory array is locked or protected. The logic states of the control signals COMP1, COMP2, and FLOCK according to an address input condition are as follows.

TABLE 2

| | Comparator Logic | | |
|---|---|---|---|
| | COMP1 | COMP2 | FLOCK |
| ADD > ADD_ST/ED | H | L | H |
| ADD_ED > ADD > ADD_ST | H | H | L |
| ADD < ADD_ST/ED | L | H | H |

In the table, ADD, ADD_ST, and ADD_ED indicate an input block address, a start block address, and an end block address, respectively.

In FIG. 7, when the reset signal RST is activated, an output signal of the S-R flip-flop 2730 has a low level. This activates the lock flag signal FLOCK by setting it to a high level at power-up. When the lock flag signal FLOCK is activated high, as set forth above, a write operation is locked or protected. Accordingly, when the lock flag signal FLOCK is activated high at power-up, a non-volatile memory array 2100 is automatically appointed to a lock (or write-protection) region.

Figure 8:
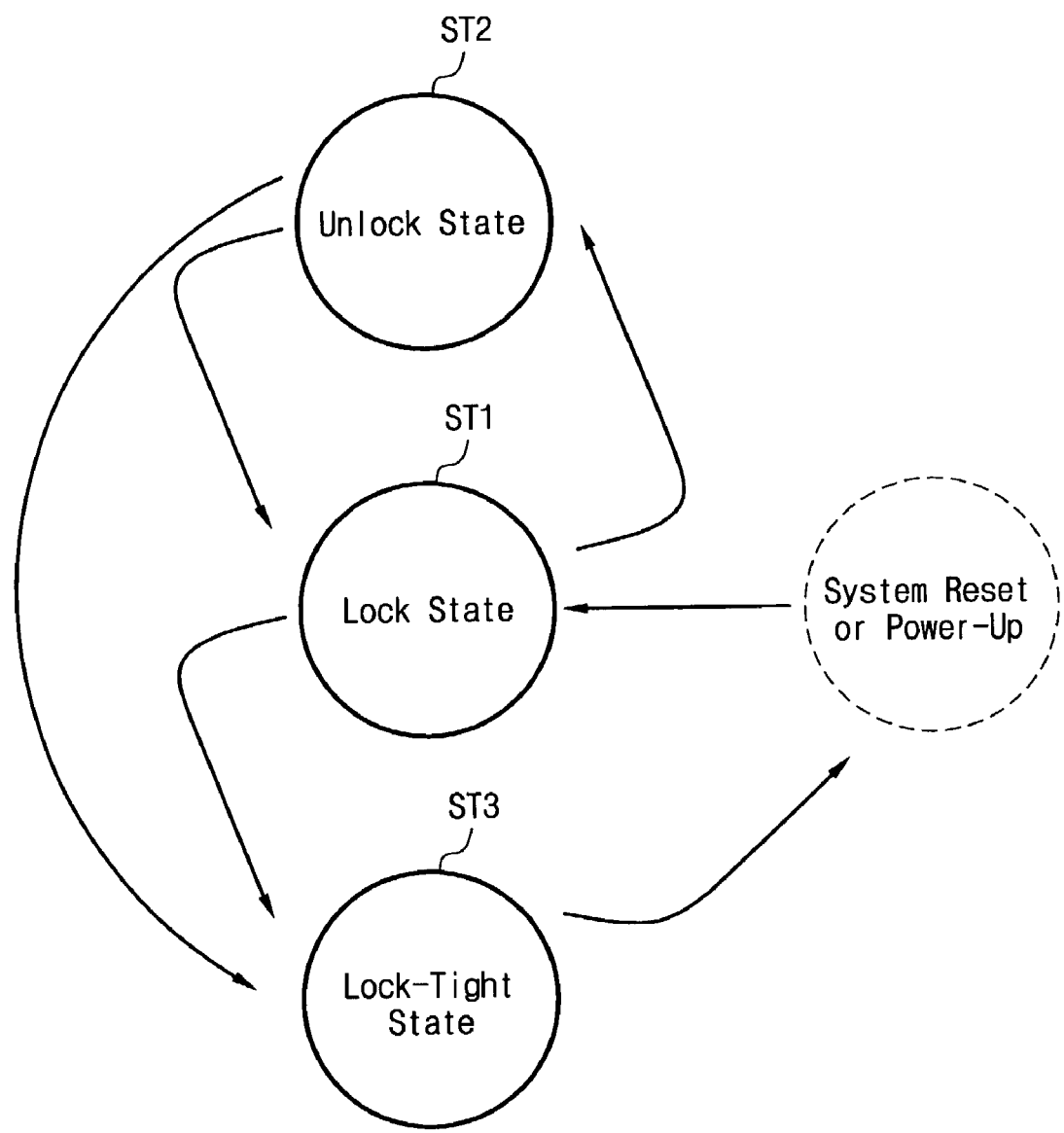
FIG. 8 is a state transition diagram for describing a write-protection state of a non-volatile semiconductor memory device according to embodiments of the present invention.

FIG. 8 is a state transition diagram that describes the lock states of a non-volatile semiconductor memory device according to certain embodiments of the present invention. Referring to FIG. 8, a non-volatile memory array 2100 is established to a lock state ST1 at a system reset or power-up. This state ST1 is called an initial state of the non-volatile memory array 2100. In the lock state ST1, all memory blocks of the array 2100 are assigned to a lock region according to the above description. The lock state ST1 of the non-volatile memory array 2100 can be changed to either an unlock state ST2 or a lock-tight (or update-protection) state ST3. The transition from the lock state ST1 to the unlock state ST2 is carried out according to the above-described procedure (that is, a sequential input of the first unlock command, a start block address, the second unlock command, and an end block address). In the unlock state ST2, a part or all of memory blocks in the array 2100 are assigned to an unlock region according to the above-described fashion. In the unlock state ST2, new start and end block addresses can be updated in an address register 2600.

The transition into a lock-tight state ST3 in the lock state ST1, as illustrated in FIG. 5, is carried out by an input of a lock-tight command LOCK_TIGHT_CMD. The unlock state ST2 of the non-volatile memory array 2100 can transition to the lock state ST1 or the lock-tight state ST3. The transition from the unlock state ST2 to the lock state ST1 may be carried out according to an input of an appropriate command. The transition from the unlock state ST2 to the lock-tight state ST3 is performed by an input of the lock-tight command LOCK_TIGHT_CMD. In the lock-tight state ST3, new start and end block addresses are not stored in the address register 2600. The lock-tight state ST3 is removed by a system reset when the state of the non-volatile memory array 2100 becomes the lock state ST1.

Figure 9:
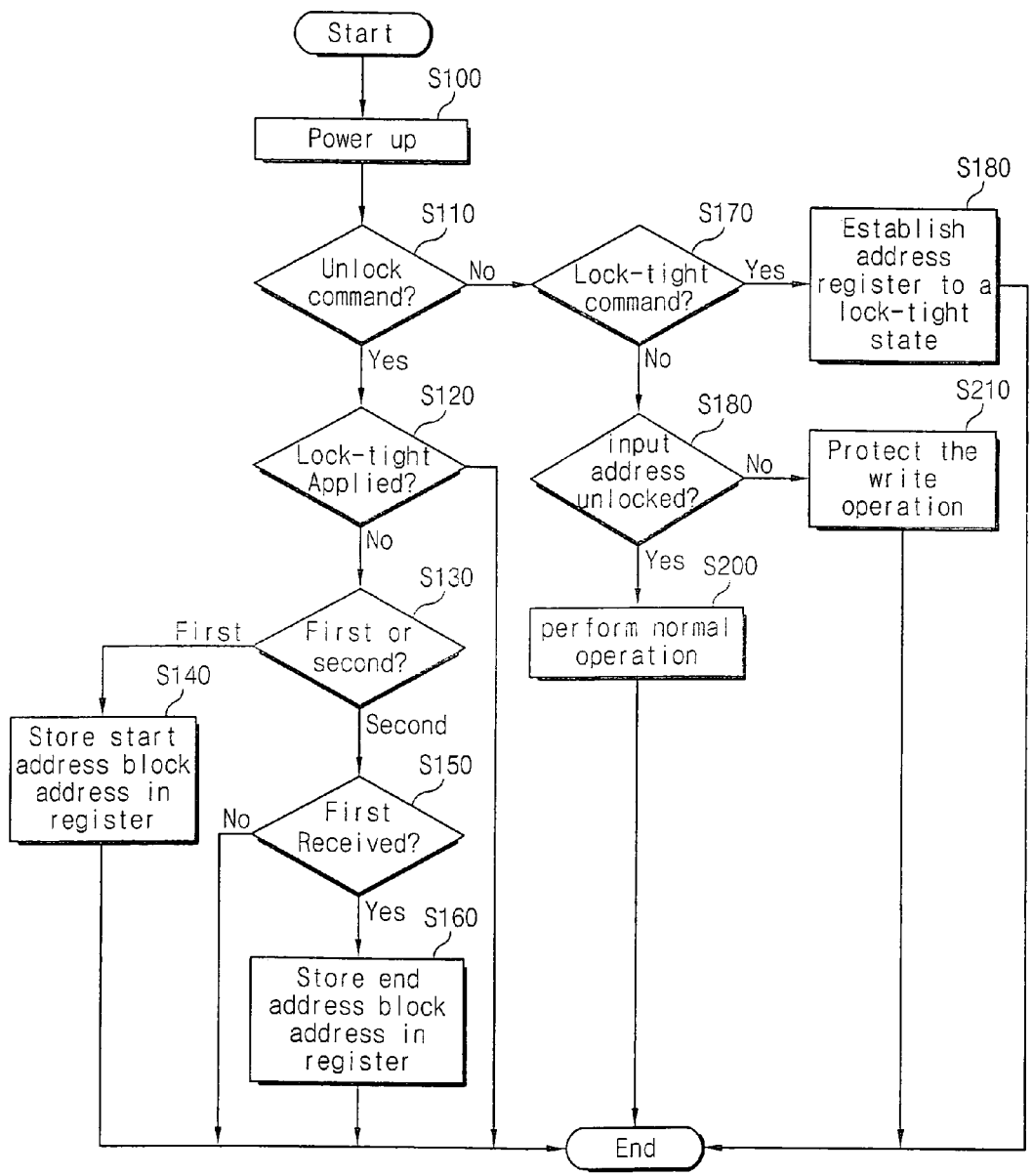
FIG. 9 is a flowchart describing operations for storing start and end block addresses of an unlock address region in an address register after power-up, performing a write operation and setting an update protection state.

FIG. 9 is a flowchart illustrating operations for storing start and end block addresses of an unlock address region in an address register, performing a write operation and/or setting an update protection state after power-up according to certain embodiments of the present invention. As illustrated in FIG. 9, at power up (block S100), a power-on reset circuit 3000 generates a reset signal RST and each block is reset by activation of the reset signal RST. As described above, when reset, the lock flag signal FLOCK is activated high so that a non-volatile memory array 2100 is set to a lock state as an initial state. When a command it is evaluated to by the command decoder circuit 2800 to determine if the command is an unlock command (block S110). If the command is an unlock command (block S110), it is determined if the memory is in a lock-tight state (block S120). If the memory is in a lock-tight state (block S120), the unlock command is ignored and operations end. If the memory is not in a lock-tight state (block S120), it is determined if the unlock command is a first unlock command UNLOCK_CMD1 (block S130). If the command is a first unlock command UNLOCK_CMD1 (block S130), the command decoder circuit 2800 activates an address latch signal LAT_ADD1, so that a start block address of an unlock region is stored in an address register 2600 (block S140). If the command is a second unlock command UNLOCK_CMD2 (block S130), it is determined if a first unlock command had been previously received (block S150). If a first unlock command had not been previously received (block S150), the command may be rejected and operations end. Alternatively, the check for a first unlock command may be bypassed and all valid unlock commands carried out. In any event, if a first unlock command has been previously received (block S150), the command decoder circuit 2800 activates an address latch signal LAT_ADD2, so that an end block address of the unlock region is stored in the address register 2600 (block S160).

If the received command is not an unlock command (block S110), a determination may be made if the received command is a lock-tight command LOCK_TIGHT_CMD (block S170). If the received command is a lock-tight command (block S170), a state of the address register 2600 is set to a lock-tight or update-protection state (block S180). This is accomplished by activating a lock-tight flag signal FLOCKT high. If the lock-tight flag signal FLOCKT is activated high, new start and end block addresses are not stored in the address register 2600.

If the received command is not a lock-tight command (block S170), then the command may be a write operation is received by the non-volatile memory array. In such a case, a determination is made as to whether the input block address ADD[X:n] belongs to an unlocked address region between the start and end block addresses stored in the address register 2600 (block S190). If the input block address ADD[X:n] is outside the unlocked address region (block S190), the write operation is locked or protected with respect to a memory block corresponding to the input block address ADD[X:n] (block S210). This is because the command decoder circuit 2800 inactivates the command flag signal FCMD in response to the lock flag signal FLOCK being activated to a high level irrespective of the input of the write command. If the input block address ADD[X:n] belongs to the unlocked address region (block S190), the write operation is normally performed with respect to the memory block corresponding to the input block address ADD[X:n] (block S200).

Figure 10:
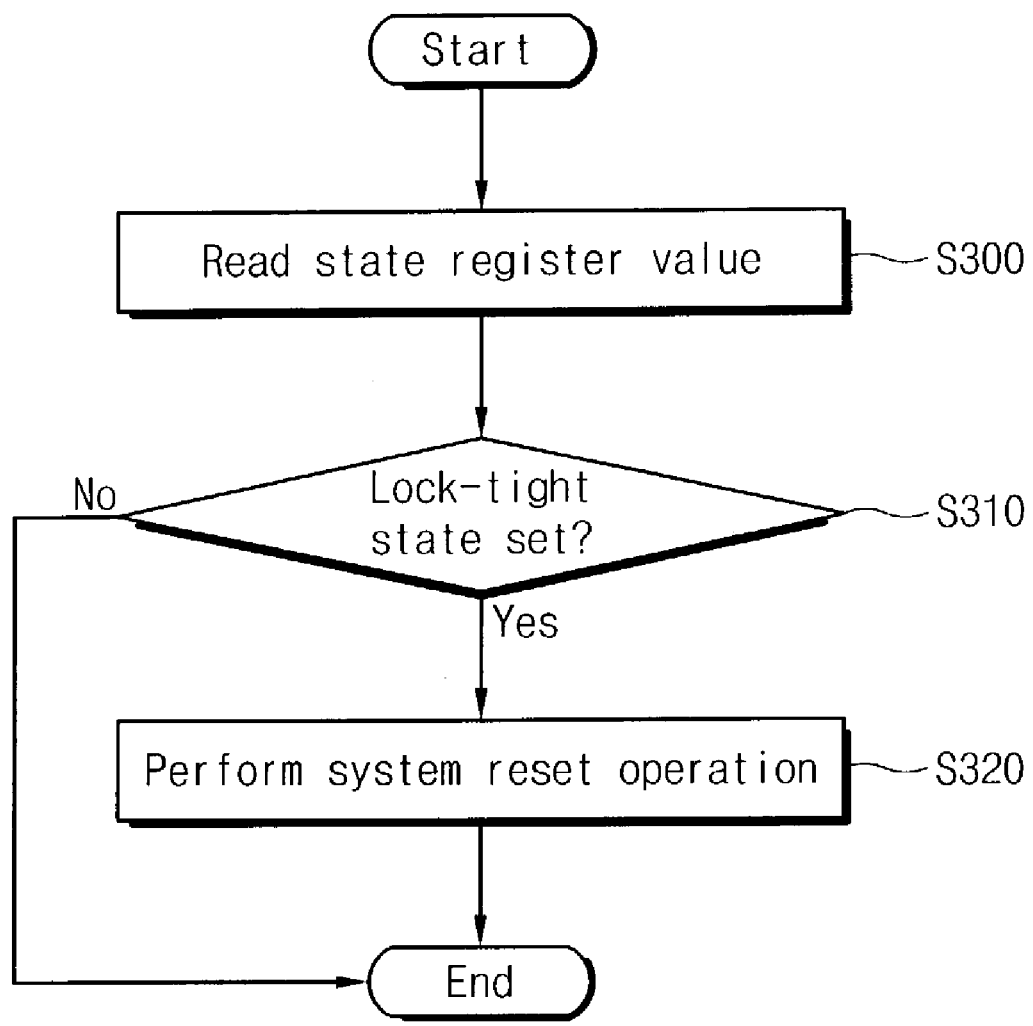
FIG. 10 is a flowchart describing operations for resetting an update-protection state.

FIG. 10 is a flowchart of operations for resetting a lock-tight state of a non-volatile memory device. As seen in FIG. 10, a state value stored in the state register 2400A of an interface circuit 2400 is transferred to a host or a memory controller (not shown) according to its request (block S300). The host processor evaluates the state value read from the state register 2400A to determine whether the state value of the state register 2400A indicates a lock-tight (or update-protection) state (block S310). If the state value does not indicate that the memory is in a lock-tight state (block S310), no further operations need be performed to allow for setting unlock start and stop addresses. However, if the state value does indicate that the memory is in a lock-tight state (block S310) such that the address register 2600 is established to the lock-tight state, a system reset operation is performed, so that the lock-tight state of the address register 2600 is removed and the non-volatile memory array 2100 is returned to the initial state or the lock state (block S320). The operations of FIG. 9 may then be carried out to reestablish the unlock start and end block addresses as described above.

Figure 11:
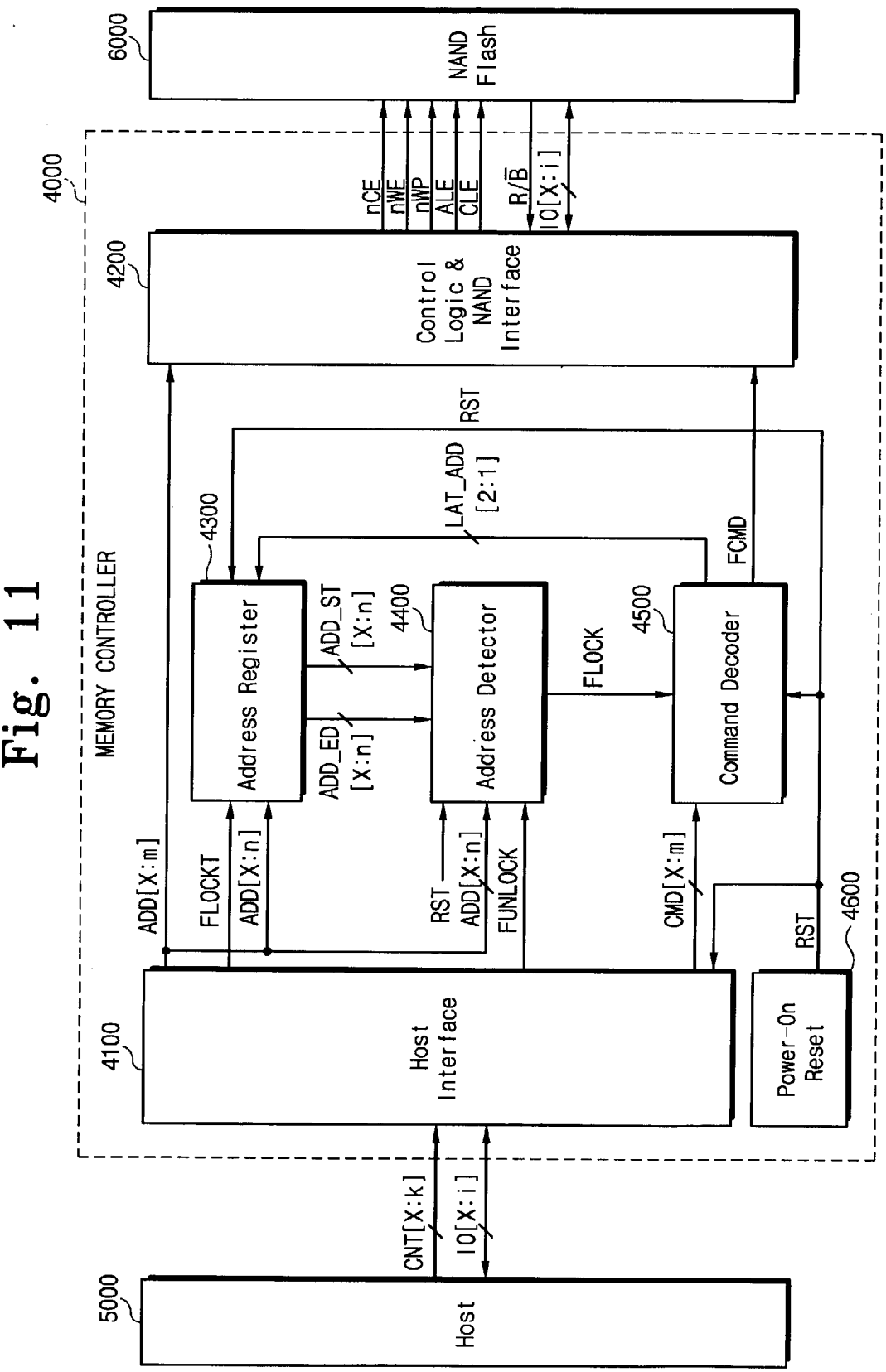
FIG. 11 is a block diagram of a memory controller with a write-protection control scheme according to embodiments of the present invention.

FIG. 11 is a block diagram of a processing system having a memory controller with a write-protection control scheme according to particular embodiments of the present invention. Referring to FIG. 11, a memory controller 4000 according to embodiments of the present invention performs an interface role between a host 5000 and a NAND-type flash memory device 6000. In particular, the memory controller 4000 controls a write-protection operation of the NAND-type flash memory device 6000. The memory controller 4000 includes a host interface circuit 4100, a control logic and NAND interface circuit 4200, an address register 4300, an address detector circuit 4400, a command decoder circuit 4500, and a power-on reset circuit 4600. Constituent elements 4100, 4300, 4400, 4500, and 4600 in FIG. 11 may be identical with those 2400, 2600, 2700, 2800, and 3000, and description thereof will be thus omitted for brevity's sake.

The control logic and NAND interface circuit 4200 selectively activates control signals into the flash memory device 6000 according to an output of the command decoder circuit 4500. For example, when the output of the command decoder circuit 4500 indicates a write operation of the memory device, the control logic and NAND interface circuit 4200 activates control signals into the memory device 6000 according to predetermined control timing. On the other hand, when the output of the command decoder block 4500 indicates a write-protection operation of the memory device 6000, the control logic & NAND interface block 4200 inactivates the control signals into the memory device 6000. Thus, write-protection of the memory device 6000 may be carried out by this manner.

While embodiments of the present invention have been described with reference to a single pair of stored start and end block addresses, as will be appreciated by those of skill in the art, a plurality of start and end block addresses could be stored so as to define a plurality of unlock and/or lock regions within the non-volatile memory device. In such embodiments, write addresses could be compared to individual pairs of start and end block addresses and the results of this comparison logically ORed to provide a write-protection signal. Furthermore, additional unlock commands may be provided to load multiple start and end block addresses. Accordingly, embodiments of the present invention should not be construed as limited to a single set of start and end block addresses or a single unlock or lock region. Similarly, some regions may be defined by logic circuits rather than start and end addresses. Thus, embodiments of the present invention may include nonvolatile memories with at least one lock and/or unlocked region defined by a start block address and stop block address, however, other regions defined in a different manner may also be provided.

The invention has been described using exemplary preferred embodiments. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A memory device comprising:
a non-volatile memory array having a plurality of memory blocks; and
a write-protection control circuit configured to store a start block address and an end block address associated with write protected regions of the non-volatile memory array and wherein the write-protection control circuit is further configured to control a write operation of the non-volatile memory array based on a relationship of a write block address of the write operation to the start block address and the end block address, wherein the write-protection control circuit is further configured to prevent the start and end block addresses from being updated after the start and end block addresses are initially stored in the write-protection control circuit, wherein the write-protection control circuit is further configured to store a plurality of start and stop block addresses that define a plurality of unlocked regions and to control a write operation of the non-volatile memory array based on a relationship of a write block address of the write operation to the plurality of unlocked regions.

2. The memory device according to claim 1, wherein the write-protection control circuit is configured to allow the write operation if the write block address is between the start block address and the end block address.

3. The memory device according to claim 1, wherein the write-protection control circuit is configured to prevent the write operation if the write block address is not between the start block address and the end block address.

4. The memory device according to claim 1, wherein the write-protection control circuit is configured to allow the write operation if the write block address is not between the start block address and the end block address.

5. The memory device according to claim 1, wherein the write-protection control circuit is configured to prevent the write operation if the write block address is between the start block address and the end block address.

6. The memory device according to claim 1, wherein the write-protection control circuit is further configured to allow the start and end block addresses stored in the write-protection control circuit to be updated so as to change the write protected regions of the non-volatile memory.

7. The memory device according to claim 1, wherein the write-protection control circuit is further configured to remove an update-protection state of the start and end block addresses responsive to a reset signal.

8. The memory device according to claim 1, wherein the write-protection control circuit is configured to latch the start block address in response to a first command indicating an input of the start block address and latch the end block address in response to a second command indicating an input of the end block address.

9. The memory device according to claim 1, wherein the write-protection control circuit is configured to prevent write operations to any of the memory blocks of the non-volatile memory array at power-up.

10. A non-volatile semiconductor memory device comprising:
a non-volatile memory array having a plurality of memory blocks;
a write control circuit configured to control a write operation of the non-volatile memory array in response to a write enable signal; and
a write-protection control circuit configured to store start and end block addresses of an unlock region of the non-volatile memory array and selectively activate the write enable signal according to whether a write address of the write operation deviates from an address region between the start and end block addresses, wherein the write-protection control circuit is further configured to prevent the start and end block addresses from being updated after the start and end block addresses are initially stored in the write-protection control circuit, wherein the write-protection control circuit comprises:
an address register configured to latch the start block address in response to a first address latch signal and latch the end block address in response to a second address latch signal;
a detector circuit configured to generate a lock flag signal indicating whether the write address deviates from the address region between the start block address and the end block address; and
a command decoder circuit configured to generate the first address latch signal in response to a first command indicating an input of the start block address, to generate the second address latch signal in response to a second command indicating an input of the end block address and to activate the write enable signal in response to the lock flag signal.

11. The non-volatile semiconductor memory device according to claim 10, wherein the detector circuit is activated after either one of the first and second commands is applied.

12. The non-volatile semiconductor memory device according to claim 11, wherein the detector circuit is further configured to set the lock signal to prevent the write operation after power-up and until the detector circuit is activated.

13. The non-volatile semiconductor memory device according to claim 10, wherein the address register is further configured to update the start and end block addresses responsive to receive subsequent first and second commands.

14. The non-volatile semiconductor memory device according to claim 10, wherein the address register is further configured to prevent updating of the start and end block addresses subsequent to receipt of a third command for protecting a change of the start and end block addresses.

15. The non-volatile semiconductor memory device according to claim 14, wherein the address register is further configured to allow updating of the start and end block addresses subsequent to receipt of a reset signal.

16. The non-volatile semiconductor memory device according to claim 10, wherein when the external address deviates from the address region between the start and end block addresses, the command decoder circuit inactivates the write enable signal so that the write operation of the non-volatile memory array is locked.

17. The non-volatile semiconductor memory device according to claim 10, wherein when the external address belongs to the address region between the start and end block addresses, the command decoder circuit activates the write enable signal so that the write operation of the non-volatile memory array is carried out.

18. A non-volatile semiconductor memory device comprising:
a non-volatile memory array having a plurality of memory blocks;
a write control circuit configured to control a write operation of the non-volatile memory array in response to a write enable signal;
an address register configured to store start and end block addresses for defining an unlock region of the non-volatile memory array in response to first and second address latch signals;
an address comparator circuit configured to generate a lock flag signal indicating whether an external address deviates from an address region between the start block address and the end block address;
a command decoder circuit configured to generate the first and second address latch signals in response to first and second commands indicating input of the start and end block addresses respectively, and to decode a write command in response to the lock flag signal so as to generate the write enable signals; and
a power-on reset circuit configured to generate a reset signal, the address register, the address comparator circuit, and the command decoder circuit being initialized by the reset signal.

19. The non-volatile semiconductor memory device according to claim 18, further comprising an interface circuit configured to interface with an external device, wherein the interface circuit inactivates an unlock flag signal in response to activation of the reset signal so that the write operation of the non-volatile memory array is locked, and the address comparator circuit operates responsive to the unlock flag signal.

20. The non-volatile semiconductor memory device according to claim 18, wherein the start and end block addresses are updated by subsequent first and second commands.

21. The non-volatile semiconductor memory device according to claim 19, wherein the interface circuit is further configured to generate a lock-tight flag signal in response to a third command for protecting a change of the start and end block addresses; and
wherein the address register is further configured to update-protect the stored start and end block addresses responsive to the lock-tight flag signal.

22. The non-volatile semiconductor memory device according to claim 21, wherein the interface circuit is further configured to inactivate the lock-tight flag signal responsive to a reset signal.

23. The non-volatile semiconductor memory device according to claim 19, wherein the interface circuit includes a state register configured to store a state code indicating lock, unlock, and lock-tight states, the state register being externally accessible.

24. A data processing system comprising:

a host processor;

a non-volatile memory; and a memory controller operably associated with the host processor and the non-volatile memory so as to control access to the non-volatile memory, wherein the memory controller includes:

a write control circuit configured to control a write operation of the non-volatile memory array in response to a write enable signal;

an address register configured to store start and end block addresses for defining an unlock region of the non-volatile memory array in response to first and second address latch signals;

an address comparator circuit configured to generate a lock flag signal indicating whether an external address deviates from an address region between the start block address and the end block address;

a command decoder circuit configured to generate the first and second address latch signals in response to first and second commands indicating input of the start and end block addresses respectively, and to decode a write command in response to the lock flag signal so as to generate the write enable signals; and a power-on reset circuit configured to generate a reset signal, the address register, the address comparator circuit, and the command decoder circuit being initialized by the reset signal.

* * * * *